340-870.12 SR

XR 3,909,811

United S [redacted]

Adler

[11] 3,909,811

[45] Sept. 30, 1975

[54] MULTIPLEXED TELEMETERING SYSTEM FOR A PLURALITY OF SIGNAL SOURCES

[75] Inventor: Alan J. Adler, Palo Alto, Calif.

[73] Assignee: Acurex Corporation, Mountain View, Calif.

[22] Filed: May 17, 1974

[21] Appl. No.: 470,978

[52] U.S. Cl. ............ 340/189; 340/183; 179/15 BL; 325/47; 307/241; 307/251

[51] Int. Cl.[2] ............ G08C 15/06

[58] Field of Search ............ 340/189, 183; 325/47

[56] References Cited

UNITED STATES PATENTS

| | | | |
|---|---|---|---|
| 3,267,449 | 8/1966 | Ryan | 340/189 |
| 3,357,007 | 12/1967 | Wike | 340/183 |
| 3,626,398 | 12/1971 | Owens | 340/183 |
| 3,708,791 | 1/1973 | Curran | 340/183 |
| 3,740,481 | 6/1973 | Lee | 340/183 |

*Primary Examiner*—Thomas B. Habecker
*Attorney, Agent, or Firm*—Flehr, Hohbach, Test, Albritton & Herbert

[57] ABSTRACT

A multiplexed telemetering system for telemetering a plurality of dc signals which may, for example, be produced by thermo-couples mounted in the rotating parts of a jet engine includes means for scanning the dc signals to produce an amplitude modulated signal which in turn drives a voltage controlled oscillator producing an FM signal which is transmitted to a decoding receiver.

3 Claims, 5 Drawing Figures

FIG. 1, FIG. 1-A

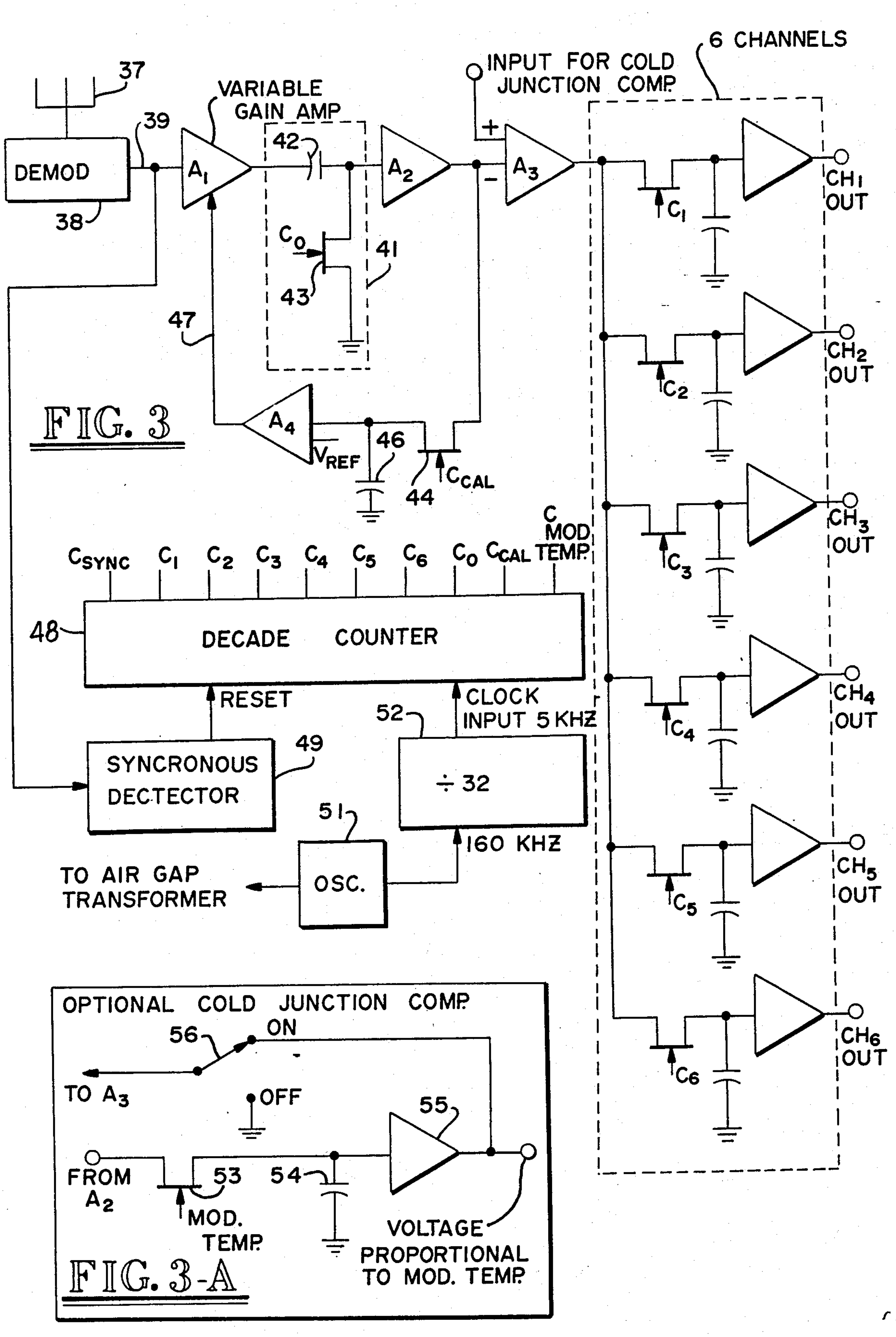
FIG. 3, FIG. 3-A

MULTIPLEXED TELEMETERING SYSTEM FOR A PLURALITY OF SIGNAL SOURCES

BACKGROUND OF THE INVENTION

The present invention is directed to a multiplexed telemetering system for dc signal sources and more specifically to a system where a miniature radio multiplexing transmitter is mounted, for example on a jet engine, to provide temperature information at several locations in the engine.

In monitoring the temperatures at several locations in a jet engine, for example, it is desirable to use a telemetry system which is wireless and a system which is relatively stable under the severe operating conditions of high "*g*" forces and high temperatures. A typical multiplexed telemetry system would include multiple subcarriers, one for each data source, which are combined in a frequency modulation signal and transmitted to a receiver. Such a system is susceptible to dc drift, especially where the signals are at low levels and where high ambient temperatures are present.

Other types of multiplex systems using scanning techniques are illustrated in U.S. Pat. Nos. 2,753,546 and 3,268,665. In addition to using mechanical commutators which make them unsuitable for use in a wireless system, U.S. Pat. No. 2,753,546 discloses a system having a very low data transmission rate; in the case of the U.S. Pat. No. 3,268,665 it does not disclose any technique of transmitting low level dc signals.

OBJECTS AND SUMMARY OF THE INVENTION

It is, therefore, an object of the present invention to provide an improved multiplexed wireless data coupling system for telemetering a plurality of signal sources on a single communications channel.

It is another object of the invention to provide a system as above which has a high data transmission rate and is relatively stable under severe ambient conditions of high temperatures and *g* forces.

In accordance with the above objects, there is provided a mutliplexed wireless data coupling system for telemetering a plurality of signal sources on a single communications channel. Means sequentially scan at a predetermined rate the signal sources and generate an amplitude modulated ac signal having sequential amplitudes related to the signals produced by the signal sources. Voltage controlled oscillator means are directly responsive to the amplitude modulated signal for generating a frequency modulated output signal whose amplitude of frequency deviation is proportional to the modulation signal and the rate of deviation is related to the predetermined scanning rate. Receiver means decode the frequency modulated output signal.

BRIEF DESCRIPTION OF THE DRAWINGS

FIG. 1A is a waveform useful in understanding the invention;

FIG. 3 is a schematic of the receiver portion of the system of the present invention; and FIG. 3A is an electrical schematic of an optional feature of the invention.

DETAILED DESCRIPTION OF THE PREFERRED EMBODIMENT

Figure 1:
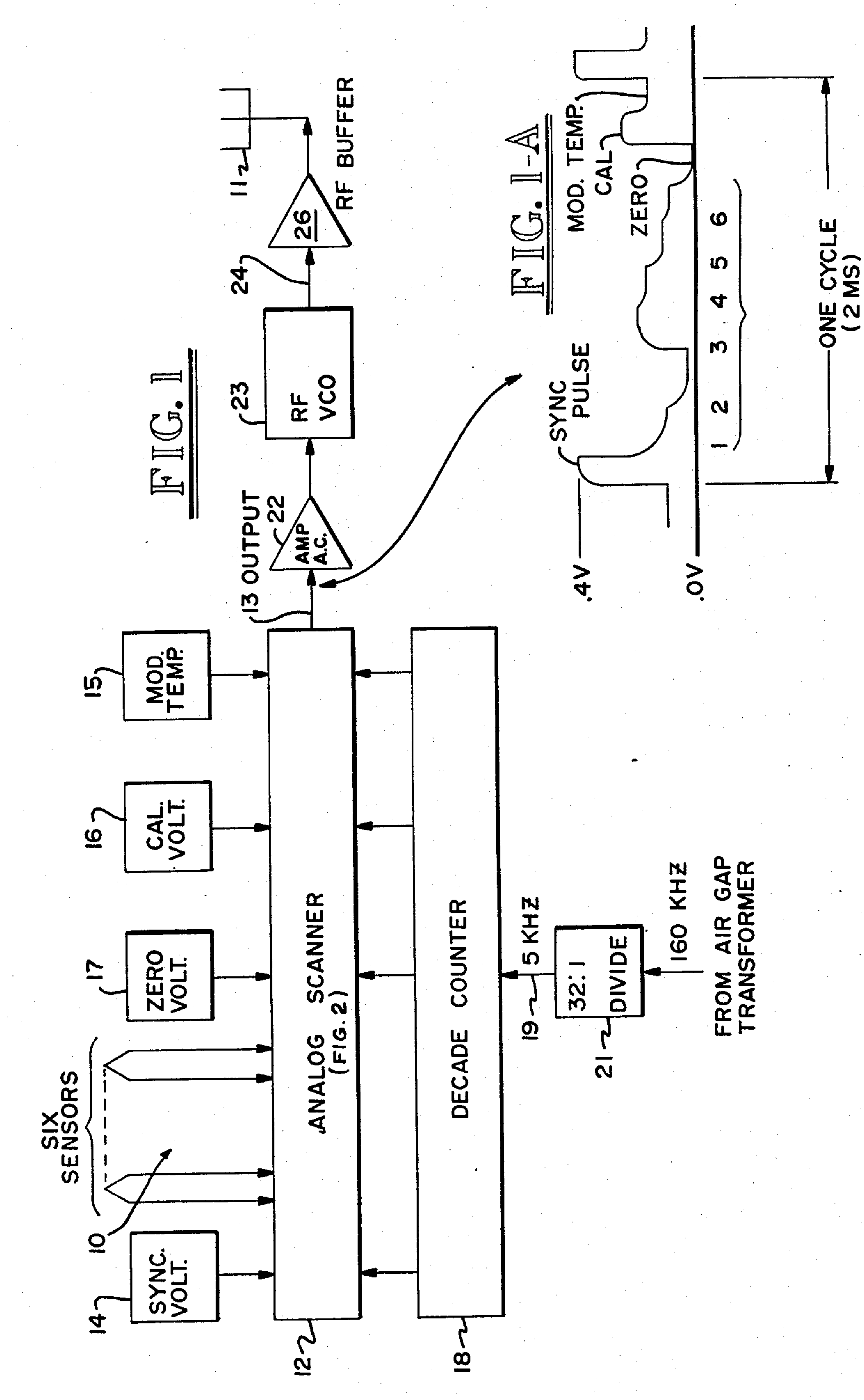
FIG. 1 is a block diagram embodying the transmitter of the present invention.

The transmitter portion of the present invention is illustrated in FIG. 1 and includes six thermo-couple type temperature sensors 10 which are mounted at various locations in, for example, a jet engine. The entire circuitry illustrated in FIG. 1 is, of course, mounted to rotate in the engine and the dc signals from the various thermo-couples 10 are transmitted over a single data channel through antenna 11 as a FM signal. Thermocouples 10 produce a signal which is characterized as dc but such signal may have a variation of several hundred or thousand Hertz.

The signal sources 10 are scanned at a predetermined scanning rate by an analog scanner 12 to produce an amplitude modulated ac signal on line 13 having sequential amplitudes related to the various dc signals present on the dc signal sources. This is illustrated by FIG. 1A where the six thermocouple sensors are numbered 1 through 6. In addition, the multiplexed amplitude modulated signal includes time slots for a synchronizing voltage indicated at 14, module temperature voltage 15 which is the ambient temperature at which the transmitters are operating, a calibration voltage 16 and a zero voltage 17. These are also indicated on the waveform of FIG. 1A.

The scanning rate of 500 Hz in the present embodiment allows dc signals of up to one half the scan rate or 250 Hz to be adequately measured.

Scanner 12 is driven by a decade counter 18 which in turn is incremented by a 5 kHz clock signal on line 19 to thereby produce the 500 Hz scan rate. This is provided through a divide by 32 circuit 21 which is driven by a 160 kHz signal supplied externally through an air gap transformer (not shown). Alternatively, the 160 kHz signal could be generated by an internal oscillator powered by a battery. The 160 kHz signal from the air gap transformer is also rectified to provide a 6 volt regulated module power supply voltage.

Still referring to FIG. 1, the analog output signal on line 13 is amplified by an ac amplifier 22 whose output in turn drives a radio frequency voltage controlled oscillator 23. This generates a frequency modulated output signal on its output line 24 which after being amplified by a radio frequency buffer amplifier 26 is coupled to antenna 11 for transmission to the receiver.

The use of a voltage controlled oscillator which is driven by an amplitude modulated signal is disclosed and claimed for a single dc source in U.S. Pat. No. 3,668,673 issued June 6, 1972 in the name of the present inventor.

Figure 2:
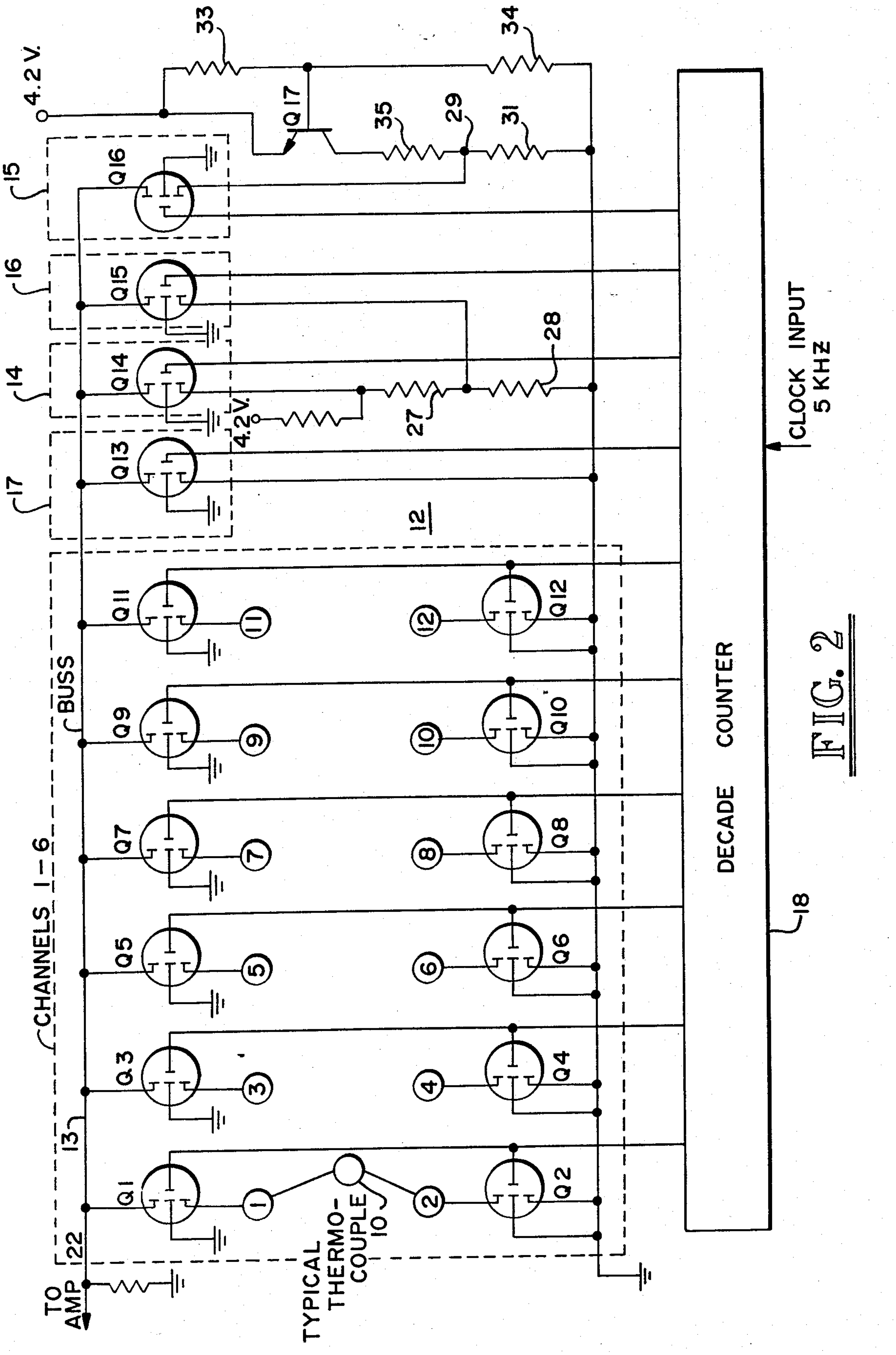
FIG. 2 is a more detailed schematic of a portion of FIG. 1.

Analog scanner 12 is shown in greater detail in FIG. 2 and illustrates a typical thermo-couple or sensor 10 coupled to terminals 1 and 2 of field effect transistors Q1 and Q2. Five other pairs of these field effect transistors which include Q3 through Q12 would be connected to the remaining sensors. In the preferred embodiment, the thermo-couples or sensors 10 are two terminal devices and a pair of field effect transistors are utilized to coupled the dc signal voltage to bus 13 on which the amplitude modulated signal appears. However, alternatively, for other types of sensors, only one field effect transistor need be utilized in combination with a common.

Decade counter 18 sequentially drives the various gate terminals of transistors Q1 through Q12. Field effect transistor Q13 provides a zero level voltage, Q14 a sync voltage, Q15 a calibrate voltage, and Q16 the module temperature voltage. Briefly, the zero voltage of Q13 driven by decade counter 18 provides a zero or ground level voltage. Q14 provides on bus 13 a relatively high level signal whose level is detected by a sync detector to provide for synchronization of the time slots of the multiplexing system. The calibration voltage of Q15 is taken off the center tap between resistors 27 and 28 which are series connected and coupled to a +4.2 volt source. The sync voltage of Q14 is also taken from the top of resistor 27. Lastly, the module temperature is provided at Q16 by the drain terminal connection to point 29 which is dependent on temperature variations in the ambient environment in which the transmitter is mounted. Such temperature dependent voltage is specifically provided by the combination of resistors 32, 33, 34 and 35 which are coupled to the transistor 17.

Now referring to FIG. 3, the FM signal voltage transmitted from the antenna 11 is received by an antenna 37 and demodulated at 38 to provide on line 39 a demodulated AM waveform similar to that shown in FIG. 1A. This drives a variable gain amplifier $A_1$ which is coupled to amplifier $A_2$ through zero clamp circuit 41 which in essence restores the dc reference voltage. Specifically, zero clamp circuit 41 includes a sample and hold capacitor 42 and a field effect transistor 43 whose gate is driven by a zero timing signal, $C_o$, from the transmitter.

The output of amplifier $A_2$ is used in a self-calibration loop which in essence compares the decoded calibration voltage through a reference voltage $V_{ref}$ and varies the gain of variable gain amplifiers $A_1$ to match it to the reference. This loop includes the field effect transistor 44 which is driven by $C_{CAL}$, the timing signal for the calibration time slot. The source of transistor 44 drives a sample and hold capacitor 46 which in turn is coupled to one terminal of the comparator amplifier $A_4$ to provide an AGC input on line 47 to amplifier $A_1$.

The output of amplifier $A_2$ also drives an operational amplifier $A_3$ which is coupled the decoding field effect transistors $C_1$ through $C_6$. The output terminals of these respective transistors drive sample and hold capacitors and respective amplifiers to provide six channels of output signals which are the reconstructed dc signals of the original sensor thermocouples 10 (FIG. 1).

Timing for the decoding or demultiplexing function is provided by the decade counter 48 which provides the $C_1$ through $C_6$ timing signals, $C_O$, $C_{CAL}$, $C_{SYNC}$, and $C_{MODULE\ TEMPERATURE}$. A sync detector 49 includes a threshold detector which is responsive to the relatively high amplitude of the sync signal and resets the decade counter 48 on receipt of the sync signal. This would occur, assuming a 5 kHz clock input, at a rate of 500 Hz. 500 Hz is also the scanning rate since the dc signal of every scanning device is sensed 500 times a second. Decade counter 10 is driven by a 5 kHz clock input from a master oscillator 51 which provides the 160 kHz signal which is divided by the divider 52. Oscillator 51 also drives the primary of the air gap transformer to transmit the 160 kHz signal to the remote transmitter which is mounted in, for example, the engine being tested.

FIG. 3A illustrates an optional cold junction compensation in which the decoded module temperature signal is added to the decoded thermo-couple signals to compensate for ambient temperature. Specifically, the output from $A_2$ is coupled through field effect transistor 53 which is driven by the module temperature timing signal from decade counter 48. The signal is coupled through a sample and hold capacitor 54 to drive amplifier 55 whose output produces a voltage proportional to module temperature. This voltage is also fed back through the option switch 56 to the positive input of amplifier $A_3$ as indicated in FIG. 3. Switch 56 allows this feature to be disabled by being placed in its off position.

In operation the six temperature sensors or thermocouples 10 are concurrently time multiplexed and converted to an ac amplitude modulated signal by the scanner 12 and associated components. This allows ac amplification to be used preventing undue drift. In addition, with the use of a voltage controlled oscillator 23 which is driven by the amplitude modulated signal, any drift in the center frequency of the voltage controlled oscillator is of no interest. This is discussed more fully in U.S. Pat. No. 3,668,673 discussed above. Moreover, the dual function of scanner 12 provides a transmitter which is very compact in size and low in weight to thus better resist the high *g* forces to which it is subject.

I claim:

1. A multiplexed wireless data coupling system for telemetering a plurality of signal sources on a single communications channel comprising: means for sequentially scanning at a predetermined rate said signal sources and generating an amplitude modulated ac signal having sequential amplitudes related to the signals produced by said signal sources and an ac frequency determined by said scanning rate; ac amplifier means; voltage controlled oscillator means directly connected to said scanning means by said ac amplifier means and directly responsive to said amplitude modulated ac signal for generating a frequency modulated radio frequency output signal whose amount of frequency deviation is proportional to the amplitudes of said modulation signal and whose rate of deviation is related to said predetermined scanning rate; antenna means for transmitting said radio frequency output signal; and receiver means for decoding said frequency modulated output signal.

2. A system as in claim 1 together with counting means incremented at a frequency proportional to said scanning rate and where said scanning means includes a plurality of field effect transistors corresponding to said signal sources and having gate terminals driven by said counter at said scanning rate.

3. A system as in claim 2 where said signal sources produce dc signals of less than 250 Hz and said scanning rate is 500Hz.

* * * * *